United States Patent
Niguchi et al.

(10) Patent No.: US 7,638,920 B2
(45) Date of Patent: Dec. 29, 2009

(54) BRUSHLESS MOTOR AND ELECTRIC POWER STEERING SYSTEM

(75) Inventors: Noboru Niguchi, Kashihara (JP); Naotake Kanda, Yamatokoriyama (JP)

(73) Assignee: JTEKT Corporation, Osaka-shi (JP)

( * ) Notice: Subject to any disclaimer, the term of this patent is extended or adjusted under 35 U.S.C. 154(b) by 164 days.

(21) Appl. No.: 11/753,818

(22) Filed: May 25, 2007

(65) Prior Publication Data
US 2007/0273241 A1 Nov. 29, 2007

(30) Foreign Application Priority Data
May 29, 2006 (JP) ............... 2006-148977

(51) Int. Cl.
*H02K 21/12* (2006.01)
(52) U.S. Cl. ............ 310/259; 310/254; 310/256; 310/258; 310/260; 310/216; 310/218; 310/156.45; 310/156.43
(58) Field of Classification Search ............ 310/254, 310/255, 256, 257, 258, 259, 260
See application file for complete search history.

(56) References Cited

U.S. PATENT DOCUMENTS

| | | | | |
|---|---|---|---|---|
| 3,840,761 A | * | 10/1974 | Muller | 310/49 R |
| 4,801,832 A | * | 1/1989 | Neumann | 310/216 |
| 4,899,073 A | * | 2/1990 | Takeuchi et al. | 310/116 |
| 5,684,352 A | * | 11/1997 | Mita et al. | 310/156.56 |
| 6,175,209 B1 | * | 1/2001 | Fei | 318/776 |
| 6,873,081 B2 | * | 3/2005 | Arai et al. | 310/215 |
| 2002/0067092 A1 | * | 6/2002 | Crapo et al. | 310/156.47 |
| 2002/0180295 A1 | * | 12/2002 | Kaneda et al. | 310/156.43 |
| 2004/0007930 A1 | * | 1/2004 | Asai et al. | 310/156.53 |
| 2004/0201300 A1 | * | 10/2004 | Honkura et al. | 310/156.43 |
| 2004/0245883 A1 | * | 12/2004 | Mitcham et al. | 310/216 |
| 2005/0174004 A1 | * | 8/2005 | Takehara et al. | 310/156.43 |
| 2005/0242677 A1 | * | 11/2005 | Akutsu et al. | 310/179 |

FOREIGN PATENT DOCUMENTS

JP  2003-250254  9/2003

OTHER PUBLICATIONS

U. S. Appl. No. 12/174,851, filed Jul. 17, 2008, Niguchi et al.
U. S. Appl. No. 12/041,343, filed Mar. 3, 2008, Niguchi et al.
U.S. Appl. No. 12/045,240, filed Mar. 10, 2008, Niguchi.

* cited by examiner

*Primary Examiner*—Quyen Leung
*Assistant Examiner*—Terrance Kenerly
(74) *Attorney, Agent, or Firm*—Oblon, Spivak, McClelland, Maier & Neustadt, L.L.P.

(57) ABSTRACT

A brushless motor including a rotor which has ten permanent magnets each containing rare earth neodymium and provided around a rotor yoke and an outside diameter of 45 mm to 55 mm, and a stator which has a stator core having twelve slots and an outside diameter of 75 mm to 85 mm and whose magnetomotive force at maximum current is 700 AT or more. The stator core is configured such that a teeth width b is 0.14 times or more of the outside diameter of the rotor.

7 Claims, 6 Drawing Sheets

—— : TEETH WIDTH = ROTOR OUTSIDE DIAMETER x 0.14
----- : TEETH WIDTH = ROTOR OUTSIDE DIAMETER x 0.13

BRUSHLESS MOTOR AND ELECTRIC POWER STEERING SYSTEM

BACKGROUND OF THE INVENTION

1. Field of the Invention

The present invention relates to a brushless motor and an electric power steering system which includes the brushless motor to assist the driver in steering a vehicle in such a way as to control the driving of the brushless motor according to a steering torque detected by a torque sensor.

2. Related Art

An electric power steering system for reducing load borne by the driver in steering a vehicle is such as to include a steering member (a steering wheel, steering handle) which is connected to an input shaft, an output shaft which is connected to control wheels via a pinion, a rack and the like and a connecting shaft which connects the input shaft with the output shaft, whereby a steering torque applied to the input shaft is detected by a torque sensor from a twist angle generated in the connecting shaft, so as to control the driving of a steering assist motor which is linked with the output shaft based on the torque value so detected.

In recent years, brushless motors have come to be used as steering assist motors in such electric power steering systems in order to cope with the tendency of high output. A brushless motor is a motor which includes permanent magnets on a rotor and controls a waveform forming circuit for generating a rotating magnetic field in a stator based on the (rotational) position of the rotor so as to cause the rotor to rotate, and since no brush is used therein, a loss by brushes, mechanical noise and electric noise by the brushes are not produced.

JP-A-2003-250254 discloses a permanent magnet type brushless motor for an electric power steering system which has ten permanent magnets on a rotor and twelve slots between teeth on a stator.

In a steering assist brushless motor for an electric steering system, for example, when teeth on a stator core are made thin, saturation in magnetic flux density is generated, and the linearity of a current-torque function is collapsed largely by the effect of the saturation in magnetic flux density, leading to a problem that the steering assist control becomes difficult.

SUMMARY OF THE INVENTION

The invention was made in view of these situations, and an object thereof is to provide a brushless motor which is difficult to be affected by the effect of saturation in magnetic flux density through first to sixth aspects of the invention.

Another object of the invention is to provide through a seventh aspect of the invention an electric power steering system which includes a brushless motor according to any of the first to sixth aspects of the invention.

According to a first aspect of the invention, there is provided a brushless motor including a rotor which has ten permanent magnets each containing rare earth neodymium and provided around a rotor yoke and an outside diameter of 45 mm to 55 mm, and a stator which has a stator core having twelve slots and an outside diameter of 75 mm to 85 mm and whose magnetomotive force at maximum current is 700 AT (ampere-turn) or more, wherein a teeth width of the stator core is 0.14 times or more of the outside diameter of the rotor.

According to a second aspect of the invention, there is provided a brushless motor according to the first aspect of the invention, wherein a slot opening width of the stator core is 0.5 mm or more.

According to a third aspect of the invention, there is provided a brushless motor according to the first or second aspect of the invention, wherein a yoke width of the stator core is 45% or more of the teeth width.

According to a fourth aspect of the invention, there is provided a brushless motor according to any of the first to third aspects of the invention, wherein the permanent magnet has a thickness of 2 mm or more in a radial direction of the rotor.

According to a fifth aspect of the invention, there is provided a brushless motor according to any of the first to fourth aspects of the invention, wherein the stator core is made up of an electromagnetic steel sheet whose magnetic flux density is 1.79 T (tesla) when a magnetizing force is 10000 A/m.

According to a sixth aspect of the invention, there is provided a brushless motor according to any of the first to fifth aspects of the invention, wherein a minimum radial thickness of the rotor yoke is 5 mm or more when a residual magnetic flux density of the permanent magnet is 1.30 T or more.

According to an seventh aspect of the invention, there is provided an electric power steering system including a torque sensor for detecting a steering torque applied to a steering member of a vehicle and a brushless motor according to any of the first to sixth aspects of the invention, wherein the brushless motor is driven according to a steering torque detected by the torque sensor, so as to assist a steering operation.

According to the brushless motor of the first aspect of the invention, since the rotor has the outside diameter of 45 mm to 55 mm, the stator has the stator core having twelve slots and the outside diameter of 75 mm to 85 mm and the magnetomotive force at maximum current of 700 AT or more, and the teeth width of the stator core is 0.14 times or more of the outside diameter of the rotor, the brushless motor can be realized which is not affected by the effect of saturation in magnetic flux density.

According to the brushless motor of the second aspect of the invention, since the slot opening width of the stator core is 0.5 mm or more, the brushless motor can be realized which is not affected by the effect of saturation in magnetic flux density.

According to the brushless motor of the third aspect of the invention, since the yoke width of the stator core is 45% or more of the teeth width, the brushless motor can be realized which is not affected by the effect of saturation in magnetic flux density.

According to the brushless motor of the fourth aspect of the invention, since the permanent magnet has the thickness of 2 mm or more in the radial direction of the rotor, the brushless motor can be realized which is not affected by the effect of saturation in magnetic flux density.

According to the brushless motor of the fifth aspect of the invention, since the stator core is made up of the electromagnetic steel sheet whose magnetic flux density is 1.79 T when the magnetizing force is 10000 A/m, the brushless motor can be realized which is not affected by the effect of saturation in magnetic flux density.

According to the brushless motor of the sixth aspect of the invention, since the minimum radial thickness of the rotor yoke is 5 mm or more when the residual magnetic flux density of the permanent magnet is 1.30 T or more, the brushless motor can be realized which is not affected by the effect of saturation in magnetic flux density.

According to the electric power steering system of the seventh aspect of the invention, since the torque sensor for detecting a steering torque applied to the steering member of the vehicle and the brushless motor according to any of the first to sixth aspects of the invention are provided, whereby the brushless motor is driven according to the steering torque detected by the torque sensor, so as to assist a steering operation, the electric power steering system can be realized which includes the brushless motor set forth in any of the first to sixth aspects of the invention as the steering assist motor.

DETAILED DESCRIPTION OF THE PREFERRED EMBODIMENTS

Hereinafter, an embodiment of the invention will be described based on the drawings.

Figure 1:
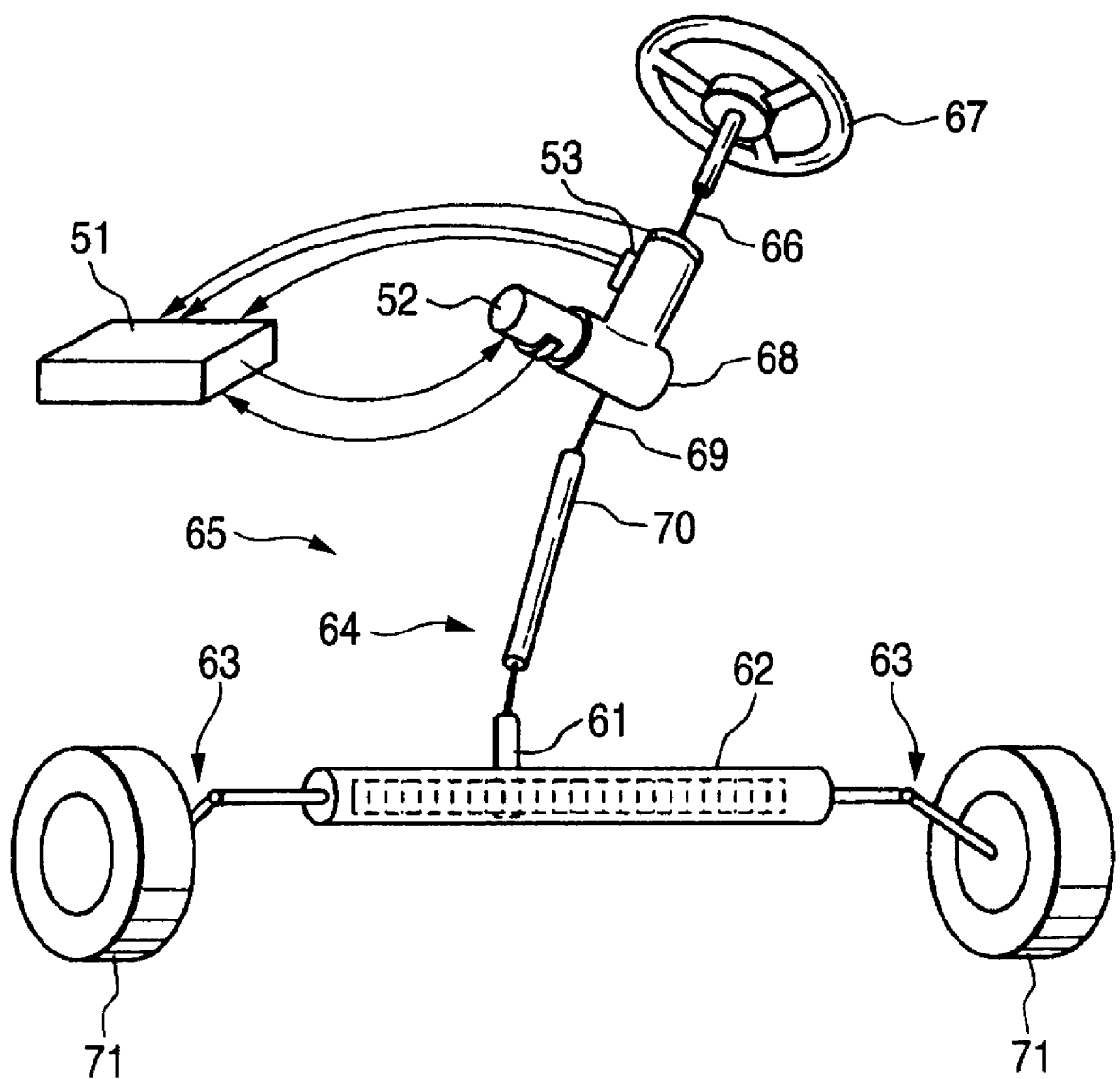
FIG. 1 is an exemplary diagram showing the configuration of an embodiment of an electric power steering system according to the invention.

FIG. 1 is an exemplary diagram which shows the configuration of an embodiment of an electric power steering system according to the invention. This electric power steering system includes, for example, a steering member (a steering wheel, steering handle) 67 for steering a vehicle, a motor 52 which is a steering assist brushless motor which is driven in response to steering operation by the steering member 67, a transmission unit 64 for transmitting rotation of the motor 52 to steering mechanisms 63, 63 via a speed reduction gear mechanism 68, and a drive control unit 51 for controlling the driving of the motor 52. The steering member 67 is connected to an input shaft 66.

The transmission unit 64 includes an output shaft 69 which is connected to the input shaft 66 via a torsion bar, not shown, a connecting shaft 70 which is connected to the output shaft 69 via a universal joint, a pinion shaft 61 which is connected to the connecting shaft 70 via a universal joint, and a rack shaft 62 which has rack teeth which mesh with a pinion on the pinion shaft 62 and is connected to left and right control wheels 71, 71 via the steering mechanism 63, 63, respectively. The input shaft 66 and the transmission unit 64 make up a steering shaft 65.

A torque sensor 53 is disposed on the periphery of the input shaft 66 for detecting the value of a steering torque applied to the input shaft 66 as a result of operating the steering member 67, and the drive control unit 51 is configured to control the driving of the steering assist motor 52 based on the steering torque value detected by the torque sensor 53.

The speed reduction gear mechanism 68 includes a worm connected to an output shaft of the motor 52 and a worm wheel which is fitted on the output shaft 69 in an intermediate position along the length of the input shaft 69, whereby the rotation of the motor 52 is configured to be transmitted to the output shaft 69 by way of the worm and worm wheel.

In the electric power steering system that is configured as has been described heretofore, a steering effort resulting from operation of the steering member 67 is transmitted to the rack shaft 62 by way of the input shaft 66, the torsion bar (not shown), the output shaft 69, the connecting shaft 70 and the pinion shaft 61, so as to move the rack shaft 62 in its axially longitudinal directions, whereby the steering mechanisms 63, 63 are activated to operate. In addition, in conjunction with the transmission of steering effort, the drive control unit 51 controls the driving of the motor 52 based on the steering torque value detected by the torque sensor 53, so as to transmit the driving force of the motor 52 to the output shaft 69 to thereby assist the driver with steering effort, whereby the load borne by the driver in association with steering the vehicle can be reduced.

Figure 2:
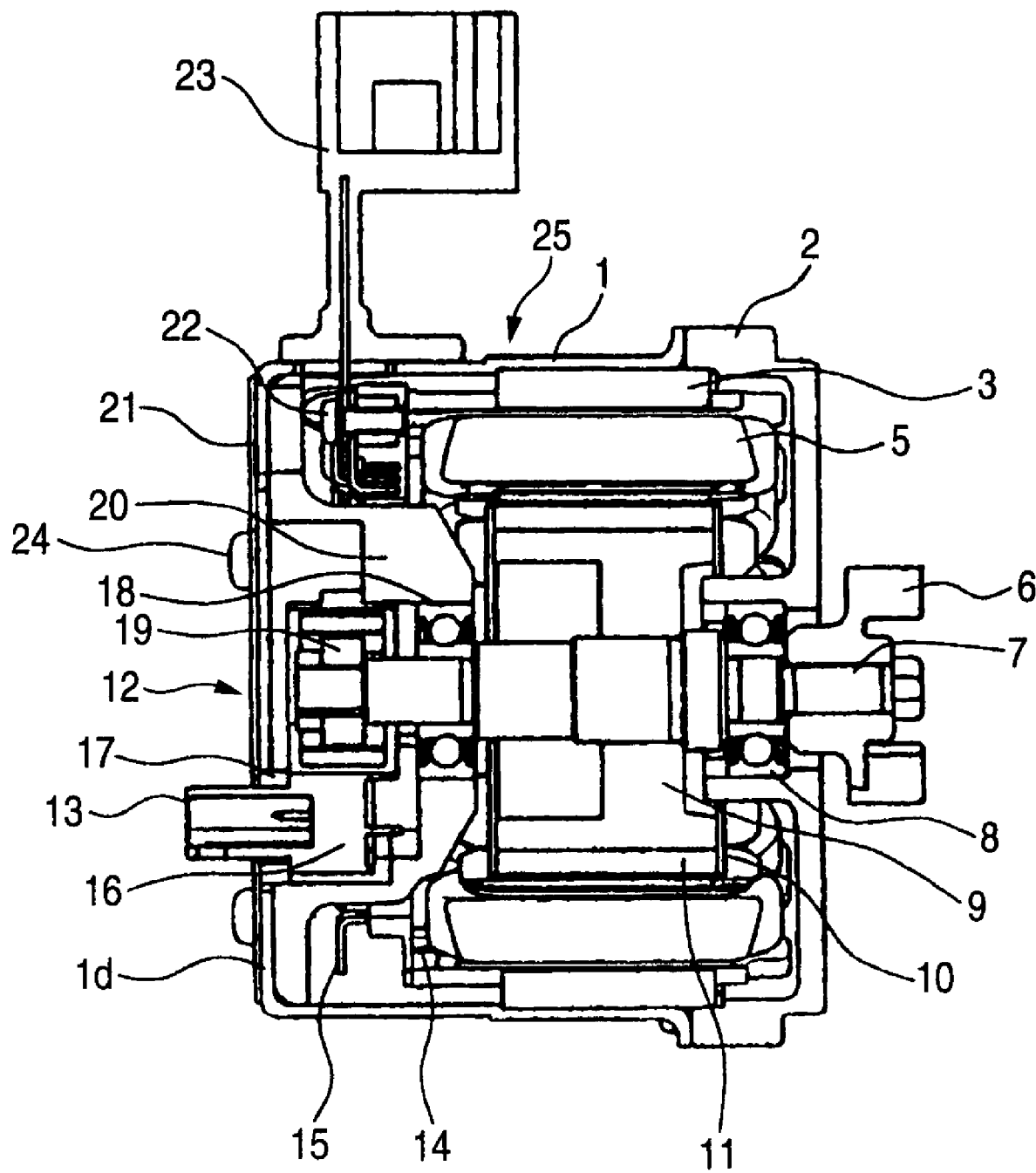
FIG. 2 is a side vertical sectional view showing the configuration of an embodiment of a brushless motor according to the invention.

FIG. 2 is a side vertical sectional view of the motor 52 which embodies a brushless motor according to the invention, the sectional view being taken along a plane which passes through a rotational axis of the motor 52.

In the motor 52, a motor case 1, which is formed into a cylindrical shape with a bottom, supports an outer circumferential surface a stator core 3 by an inner circumferential surface thereof, and a through hole is provided in a central portion of a bottom provided on one end of the motor 52. A stator is made up by winding stator coils around the stator core 3 in such a way that its magnetomotive force at a maximum current becomes 700 AT.

Figure 3:
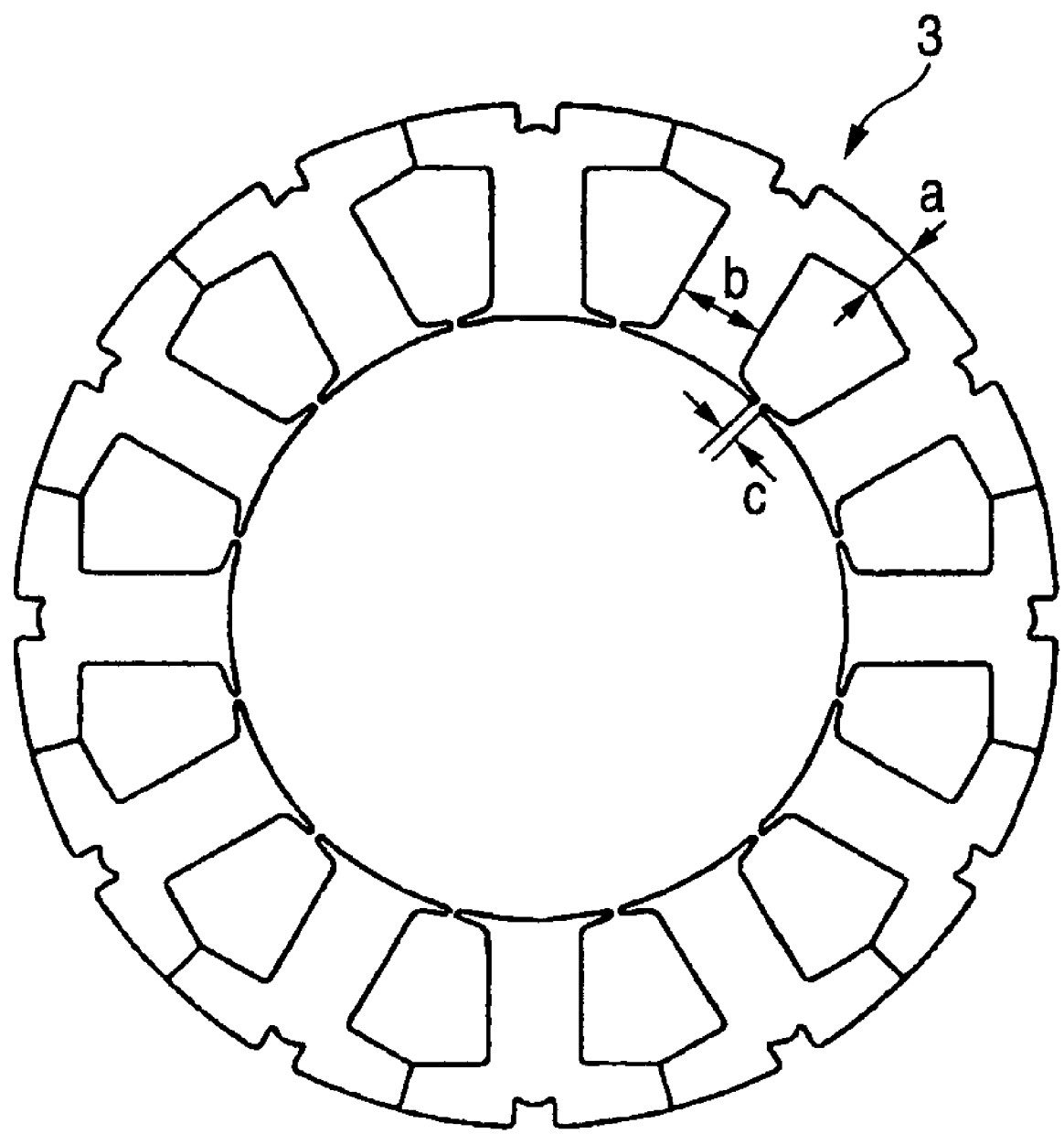
FIG. 3 is a cross-sectional view showing a cross-sectional configuration example of a stator core.

The stator core 3 has an outside diameter of 75 to 85 mm and is made up of an electromagnetic steel sheet whose magnetic flux density is 1.79 T or more when the magnetizing force is 10000 A/m. As is shown in a cross-sectional view in FIG. 3, the stator core 3 has twelve slots. In addition, the stator core 3 has a yoke width a of 4.4 mm and a teeth width b of 7.7 mm, and a slot opening c of 0.5 mm or more, and the yoke width a is made to be 45% or more of the teeth width b.

Figure 4:
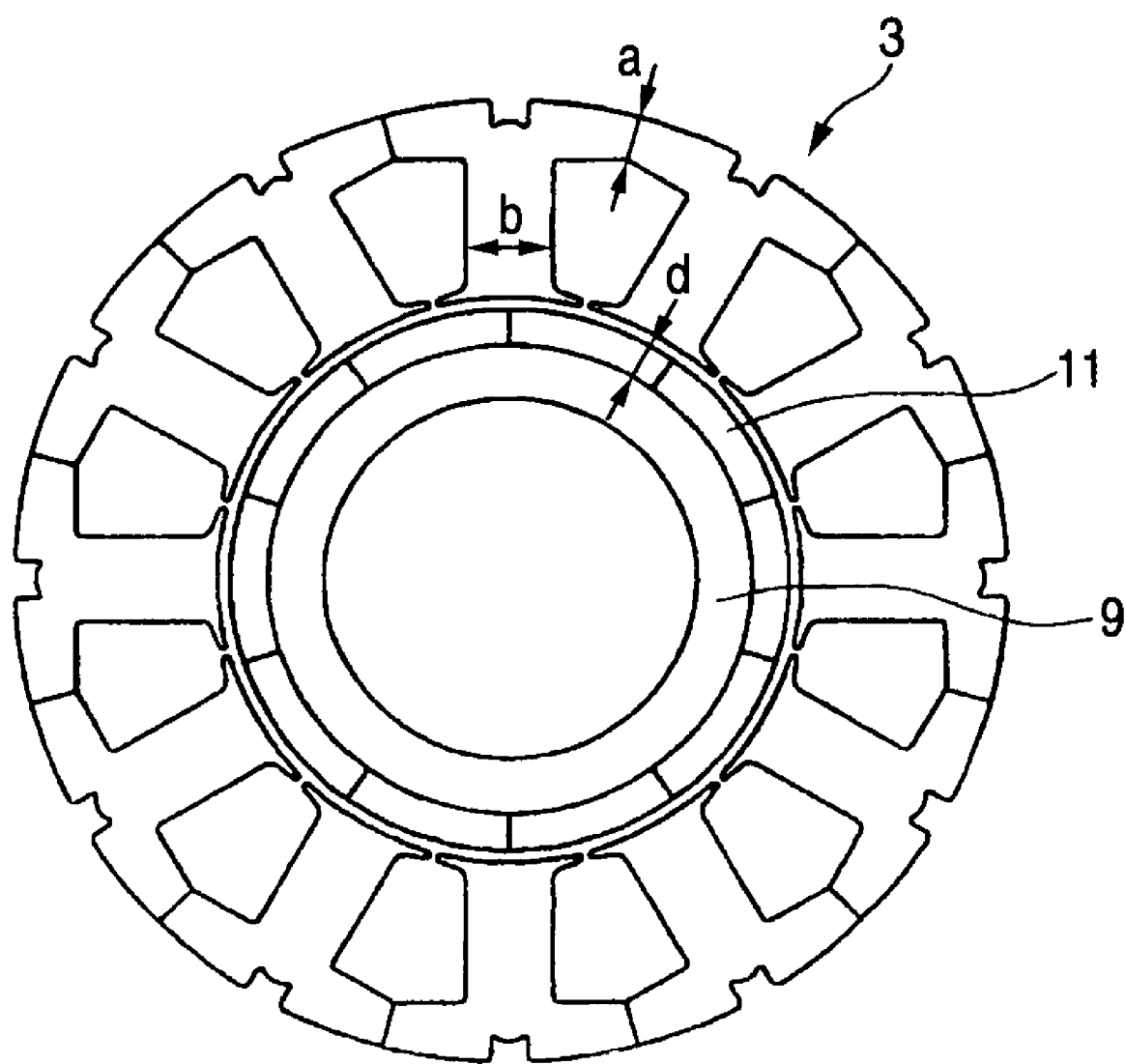
FIG. 4 is a cross-sectional view showing the cross-sectional configuration example of the stator core and a cross-sectional configuration example of a rotor.

A rotor yoke 9 is provided circumferentially in a position which oppositely faces the stator coils 5 of a rotating shaft 7, and as is shown in a cross-sectional view in FIG. 4, ten permanent magnets 11 each containing rare earth neodymium are affixed to an outer circumferential surface of the rotor yoke 9 in a ring-like shape. The rotor yoke 9 and the whole of the permanent magnets 11 are accommodated in a protection tube 10, so as to make up a rotor whose outside diameter is 45 to 55 mm.

The teeth width b (7.7 mm) of the stator core 3 is determined to be 0.14 times or more of the outside diameter of the rotor.

A thickness d in a radial direction of the rotor of the permanent magnet 11 is determined to be 2 mm or more, and when a residual magnetic flux density of the permanent magnet 11 is 1.30 T or more, a minimum radial thickness of the rotor yoke 9 is determined to be 5 mm or more.

In addition, in the event that the thickness d in the radial direction of the rotor of the permanent magnet 11 is 2 mm or more, a sufficient residual magnetic flux density of 1.30 T or more can be obtained.

An opening at the other end of the motor case 1 is covered by a bracket 2, and the bracket 2 supports an output shaft side bearing 8 which lies at the other end of the rotating shaft 7 by an inner circumferential surface of a through hole which is formed in a central portion thereof.

The stator core 3 is press fitted into the motor case 1 from the opening until it comes into abutment with a stepped portion 25 formed circumferentially on an inner circumferential surface of the motor case 1, with a portion thereof left outside of the motor case 1, and the portion left not press fitted into the motor case 1 constitutes a sliding fitting portion for forming a sliding fitting structure with the bracket 2.

A bearing 18 on an opposite side to the output shaft or lying at one end of the rotating shaft 7 is supported by an inner circumferential surface of a through hole provided in a central portion of a bottom of an end housing 20, which is formed into a cylindrical shape with a bottom, which lies on the other side of the end housing 20. A flange portion is provided along a circumference of one end portion of the end housing 20, and the end housing 20 is press fitted or inserted from an opening thereof until the flange portion comes into abutment with the bottom of the motor case 1.

A bus bar housing 14 is provided circumferentially along an outer circumferential surface of a cylindrical portion of the end housing 20, and a resolver rotor 19 of a resolver (a rotational angle sensor) 12 for detecting the rotational position of the rotor and a resolver stator 16 which is provided on an outer circumferential portion thereof are accommodated in the interior of the end housing 20.

A power supply line and a signal line of the resolver 12 are connected to the drive control unit 51 by a connector 13, and the connector 13 is provided in such a manner as to be inserted into a grommet 17 which is securely provided in a hole provided in the end cover 21.

A connector 23 is provided on a circumferential surface of the motor case 1 in a position which lies around the bottom thereof in such a manner as to project therefrom for connection with the drive control unit 51. Terminals on a motor side of the connector 23 are passed through a hole in the outer circumferential surface of the motor case 1 and are then caused to project into the interior of the motor case 1, so as to be screwed on to corresponding terminals on a bus bar 15 with screws 22, respectively.

The end cover 21 is formed into a shape which substantially matches the shape of the bottom of the motor case and covers the bottom of the motor case 1, the end housing 20 and the resolver 12 so as to prevent the infiltration of contaminations thereinto. The end cover 21 is screwed on to the end housing 20 by screws 24 which pass through three holes provided in a circumferential edge portion of the end cover 21 to be screwed into three screw holes provided in the end housing 20.

Figure 5:
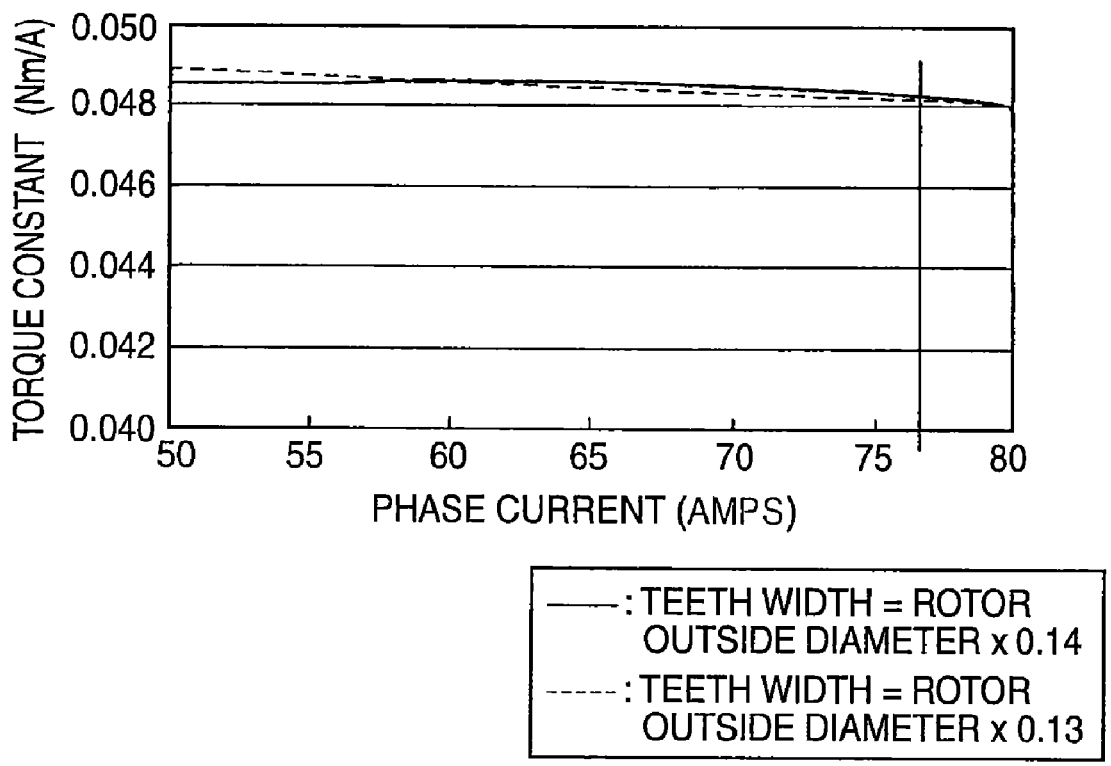
FIG. 5 is a characteristic diagram showing a relationship between a phase current and a torque constant when a teeth width is 0.13 and 0.14 time an outside diameter of the rotor.

In the motor 52 that is configured as has been described heretofore, as is shown in FIG. 5, when the teeth width b of the stator core 3 is, for example, 0.13 time the outside diameter of the rotor, the effect of saturation in magnetic flux density has already been remarkable with a phase current of 50 A (an effective value), while when the teeth width b of the stator core 3 is, for example, 0.14 time the outside diameter of the rotor, the effect of saturation appears at last with a phase current of the order of 77 A. Since the number of turns is made to be nine as this occurs, the magnetomotive force becomes about 700 AT.

From the above, in the event that an electromagnetic steel sheet whose magnetic flux density is less than 1.79 T when the magnetizing force is 10000 A/m is used for the core state 3, the effect of saturation in magnetic flux density comes to appear with a lower current value. Consequently, by using an electromagnetic steel sheet whose magnetic flux density is 1.79 T or more when the magnetizing force is 10000 A/m for the stator core 3 and making the teeth width b of the stator core 3 to be 0.14 times or more of the outside diameter of the rotor, the motor 52 can be made difficult to be affected by the effect of saturation in magnetic flux density.

Figure 6:
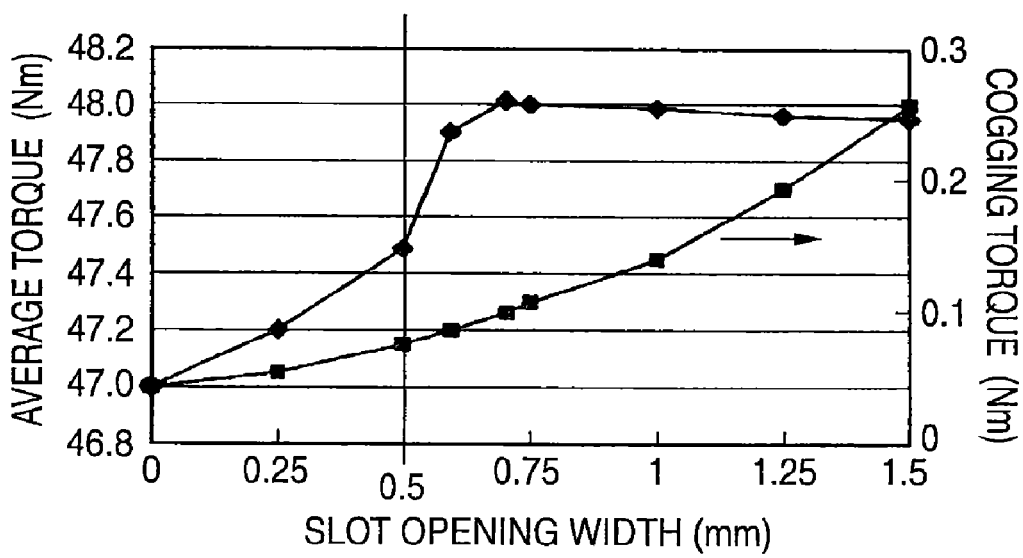
FIG. 6 is a characteristic diagram showing a relation ship between a slot opening width and an average (output) torque.

In addition, with the motor 52 that is configured as has been described above, a relationship between the slot opening width c of the stator core 3 and an average (output) torque is shown by a characteristic diagram shown in FIG. 6. Here, when the slot opening width is 0.75 mm, the average (output) torque takes a maximum value, however, in the event that a torque reduction of up to 1% is permitted, the slot width becomes 0.5 mm or more. However, since a cogging torque becomes large, an upper limit is imposed on the slot opening width.

Figure 7:
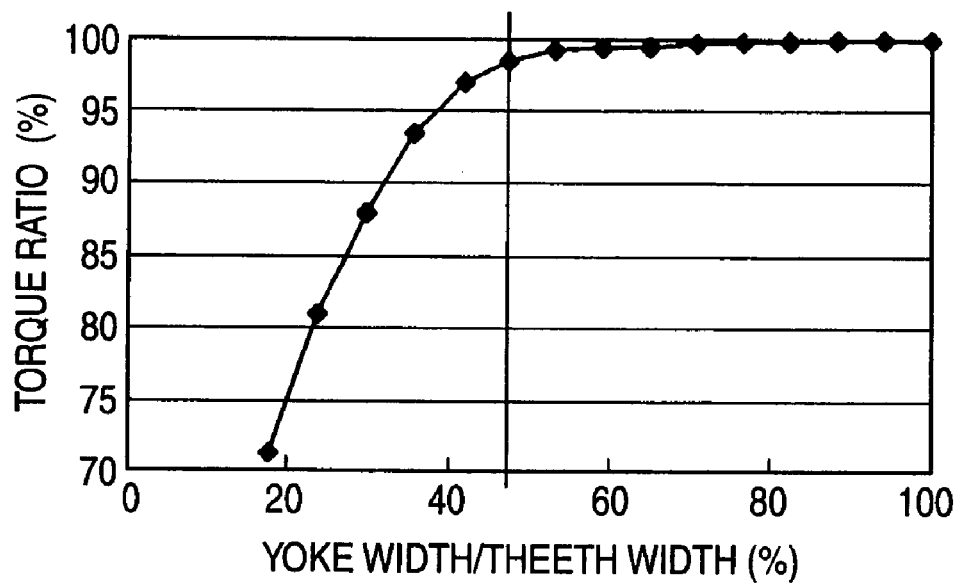
FIG. 7 is a characteristic diagram showing a relationship between a yoke width/teeth width (%) of the stator core and a (output) torque ratio (%; a maximum value is 100).

In addition, with the motor 52 that is configured as has been described above, a relationship between the yoke width a/teeth width b (%) of the stator core 3 and the (output) torque ratio (%; a maximum value is 100) is shown by a characteristic diagram shown in FIG. 7. Here, in the event that a torque reduction of up to 1% is permitted, the yoke width a needs to be 45% or more of the teeth width b of the stator core 3.

Figure 8:
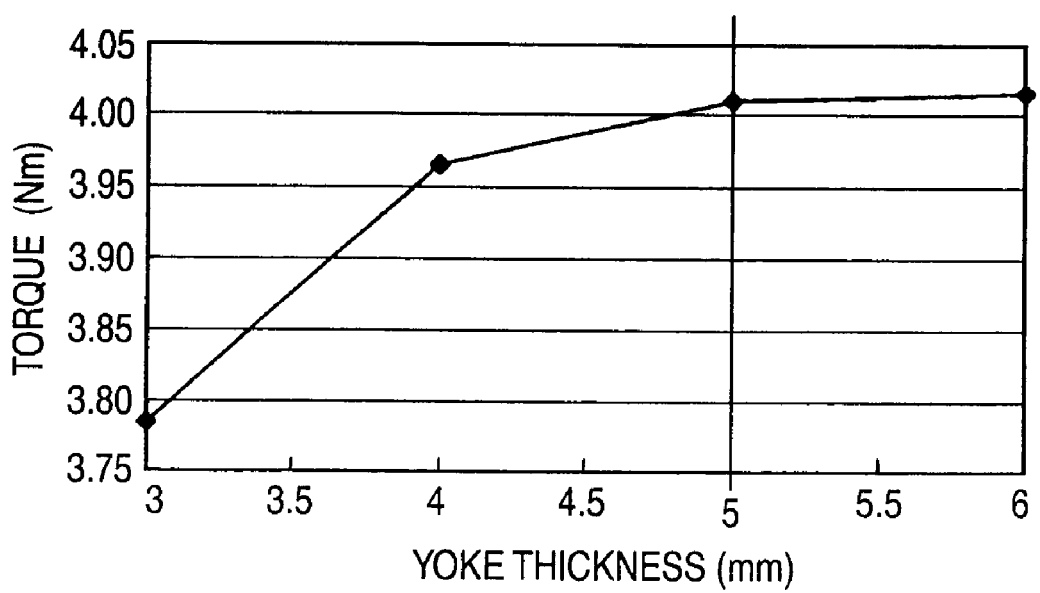
FIG. 8 is a characteristic diagram showing a relationship between a minimum radial thickness (mm) of a rotor yoke and a (output) torque (Nm).

In addition, with the motor 52 that is configured as has been described above, a relationship between the minimum radial thickness (mm) of the rotor yoke 9 and the (output) torque (Nm) is shown by a characteristic diagram shown in FIG. 8. Here, in the event that the minimum radial thickness of the rotor yoke 9 is 5 (mm) or more, the reduction in (output) torque can be suppressed within 0.1%.

What is claimed is:

1. A brushless motor having a magnetic flux density which is not saturated at a maximum current, comprising:
    a rotor which has ten permanent magnets each containing rare earth neodymium and provided around a rotor yoke and an outside diameter of 45 mm to 55 mm, and
    a stator which has a stator core having twelve slots and an outside diameter of 75 mm to 85 mm and whose magnetomotive force at maximum current is 700 AT or more without substantial saturation of the magnetic flux density,
    wherein a teeth width of the stator core is 0.14 times or more of the outside diameter of the rotor.

2. A brushless motor according to claim 1, wherein a slot opening width of the stator core is 0.5 mm or more.

3. A brushless motor according to claim 1, wherein a yoke width of the stator core is 45% or more of the teeth width.

4. A brushless motor according to claim 1, wherein each of the permanent magnets has a thickness of 2 mm or more in a radial direction of the rotor.

5. A brushless motor according to claim 1, wherein the stator core is made up of an electromagnetic steel sheet whose magnetic flux density is 1.79 T when a magnetizing force is 10000 A/m.

6. A brushless motor according to claim 1, wherein a minimum radial thickness of the rotor yoke is 5 mm or more when a residual magnetic flux density of the permanent magnet is 1.30 T or more.

7. An electric power steering system comprising:
    a torque sensor for detecting a steering torque applied to a steering member of a vehicle; and
    a brushless motor according to claim 1,
    wherein the brushless motor is driven according to a steering torque detected by the torque sensor so as to assist a steering operation.

* * * * *